(12) United States Patent
Mosset et al.

(10) Patent No.: US 8,083,825 B2
(45) Date of Patent: Dec. 27, 2011

(54) FILTER ARRANGEMENT AND METHOD

(75) Inventors: Wade Stephen Mosset, Savage, MN (US); John David Kuhn, Richfield, MN (US); Susan Rae Brady, Chanhassen, MN (US); Donald Duane Larson, Brooklyn Park, MN (US); Wayne R. W. Bishop, St. Louis Park, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 681 days.

(21) Appl. No.: 11/816,994

(22) PCT Filed: Feb. 27, 2006

(86) PCT No.: PCT/US2006/007078
§ 371 (c)(1),
(2), (4) Date: Nov. 3, 2008

(87) PCT Pub. No.: WO2006/093960
PCT Pub. Date: Sep. 8, 2006

(65) Prior Publication Data
US 2009/0211450 A1 Aug. 27, 2009

Related U.S. Application Data

(60) Provisional application No. 60/657,116, filed on Feb. 28, 2005.

(51) Int. Cl.
*B01D 46/00* (2006.01)

(52) U.S. Cl. .............. 55/502; 55/497; 55/498; 55/503; 55/521; 123/198 E

(58) Field of Classification Search ................ 55/385.3, 55/497, 498, 502, 503, 521; 123/198 E
See application file for complete search history.

(56) References Cited

U.S. PATENT DOCUMENTS

| | | | |
|---|---|---|---|
| 1,238,068 A | 8/1917 | Slater et al. |
| 2,502,545 A | 4/1950 | Wellborn |
| 2,599,604 A | 6/1952 | Bauer et al. |
| 2,890,796 A | 1/1959 | Blood |
| 2,887,177 A | 5/1959 | Mund et al. |
| 3,025,963 A | 3/1962 | Bauer |

(Continued)

FOREIGN PATENT DOCUMENTS

EP 1 364 695 A1 11/2003

(Continued)

OTHER PUBLICATIONS

International Search Report, mailed Mar. 29, 2007.

(Continued)

*Primary Examiner* — Robert Clemente
(74) *Attorney, Agent, or Firm* — Merchant & Gould P.C.

(57) ABSTRACT

A filter arrangement includes a filter media pack having a side wall. A ring is oriented around and against the side wall of the filter media pack. The ring includes a band having an interior surface oriented against the side wall of the filter media pack and an opposite exterior surface. A first seal member is secured to the exterior surface of the band. The first seal member is oriented radially from the filter media pack. The filter media pack includes Z-media having an inlet flow face and an opposite outlet flow face. An air cleaner including a housing with a filter element operably installed therein is provided. Methods of installing, filtering, and servicing are described.

28 Claims, 14 Drawing Sheets

U.S. PATENT DOCUMENTS

| | | |
|---|---|---|
| 3,076,554 A | 2/1963 | Bub |
| 3,209,917 A | 10/1965 | Yelinek |
| 3,216,578 A | 11/1965 | Wright et al. |
| 3,695,012 A | 10/1972 | Rolland |
| 3,712,033 A | 1/1973 | Gronholz |
| 4,065,341 A | 12/1977 | Cub |
| 4,158,449 A | 6/1979 | Sun et al. |
| 4,159,899 A | 7/1979 | Deschenes |
| 4,162,906 A | 7/1979 | Sullivan et al. |
| 4,187,091 A | 2/1980 | Durre et al. |
| 4,359,330 A | 11/1982 | Copley |
| 4,430,223 A | 2/1984 | Miyakawa et al. |
| 4,537,608 A | 8/1985 | Koslow |
| RE32,185 E | 6/1986 | Copley |
| 4,617,122 A | 10/1986 | Kruse et al. |
| 4,673,503 A | 6/1987 | Fujimoto |
| 4,767,531 A | 8/1988 | Holzer |
| 4,925,469 A | 5/1990 | Clement et al. |
| 4,925,561 A | 5/1990 | Ishii et al. |
| 4,963,170 A | 10/1990 | Weber et al. |
| 4,963,171 A | 10/1990 | Osendorf |
| 4,997,466 A | 3/1991 | Hood |
| 5,030,264 A | 7/1991 | Klotz et al. |
| 5,125,941 A | 6/1992 | Ernst et al. |
| 5,137,696 A | 8/1992 | Hitachi et al. |
| 5,211,846 A | 5/1993 | Kott et al. |
| 5,213,596 A | 5/1993 | Kume et al. |
| 5,229,078 A | 7/1993 | Haerle |
| 5,240,479 A | 8/1993 | Bachinski |
| 5,304,312 A | 4/1994 | Forster et al. |
| 5,346,675 A | 9/1994 | Usui et al. |
| 5,374,402 A | 12/1994 | Hitachi et al. |
| 5,415,677 A | 5/1995 | Ager et al. |
| 5,435,870 A | 7/1995 | Takagaki et al. |
| 5,472,463 A | 12/1995 | Herman et al. |
| 5,484,466 A | 1/1996 | Brown et al. |
| 5,487,767 A | 1/1996 | Brown |
| 5,494,497 A | 2/1996 | Lee |
| 5,543,007 A | 8/1996 | Takagaki et al. |
| 5,547,480 A | 8/1996 | Coulonvaux |
| 5,679,074 A | 10/1997 | Siegel |
| 5,714,126 A | 2/1998 | Frund |
| 5,730,768 A | 3/1998 | Kaminaga et al. |
| 5,740,774 A | 4/1998 | Kennedy |
| 5,772,883 A | 6/1998 | Rothman et al. |
| D396,098 S | 7/1998 | Gillingham et al. |
| 5,792,247 A | 8/1998 | Gillingham et al. |
| 5,820,646 A | 10/1998 | Gillingham et al. |
| 5,871,557 A | 2/1999 | Tokar et al. |
| 5,895,574 A | 4/1999 | Friedmann et al. |
| 5,897,676 A | 4/1999 | Engel et al. |
| 5,902,364 A | 5/1999 | Tokar et al. |
| D417,268 S | 11/1999 | Gillingham |
| 6,004,366 A | 12/1999 | Engel et al. |
| 6,164,457 A | 12/2000 | Schlör |
| 6,179,890 B1 | 1/2001 | Ramos et al. |
| 6,190,432 B1 | 2/2001 | Gieseke et al. |
| D439,963 S | 4/2001 | Gieseke et al. |
| 6,210,469 B1 | 4/2001 | Tokar |
| 6,221,122 B1 | 4/2001 | Gieseke et al. |
| 6,231,630 B1 | 5/2001 | Ernst et al. |
| 6,235,195 B1 | 5/2001 | Tokar |
| 6,299,661 B1 | 10/2001 | Bloomer |
| 6,348,084 B1 | 2/2002 | Gieseke et al. |
| 6,350,291 B1 | 2/2002 | Gieseke et al. |
| 6,368,374 B1 | 4/2002 | Tokar et al. |
| 6,375,700 B1 | 4/2002 | Jaroszczyk et al. |
| 6,391,076 B1 | 5/2002 | Jarosszyzk et al. |
| 6,416,561 B1 | 7/2002 | Kallsen et al. |
| 6,482,247 B2 | 11/2002 | Jaroszczyk et al. |
| 6,511,599 B2 | 1/2003 | Jaroszyzk et al. |
| 6,585,792 B2 | 7/2003 | Schneider et al. |
| 6,598,580 B2 | 7/2003 | Baumann et al. |
| 6,610,126 B2 | 8/2003 | Xu et al. |
| 6,641,637 B2 | 11/2003 | Kallsen et al. |
| 6,875,256 B2 | 4/2005 | Gillingham et al. |
| 6,878,190 B1 | 4/2005 | Xu et al. |
| 6,908,494 B2 | 6/2005 | Gillingham et al. |
| 6,916,360 B2 | 7/2005 | Seguin et al. |
| 6,966,940 B2 | 11/2005 | Krisko et al. |
| 6,997,968 B2 | 2/2006 | Xu et al. |
| 7,004,986 B2 | 2/2006 | Kopec et al. |
| 7,090,711 B2 | 8/2006 | Gillingham et al. |
| 7,520,913 B2 | 4/2009 | Mills et al. |
| 7,674,308 B2 | 3/2010 | Krisko et al. |
| 2002/0185007 A1 | 12/2002 | Xu et al. |
| 2002/0189457 A1 | 12/2002 | Dallas et al. |
| 2003/0154863 A1 | 8/2003 | Tokar et al. |
| 2004/0255781 A1 | 12/2004 | Tokar et al. |
| 2005/0022484 A1 | 2/2005 | Krisko et al. |
| 2005/0022669 A1 | 2/2005 | Xu et al. |
| 2006/0123990 A1 | 6/2006 | Tokar et al. |
| 2007/0186774 A1 | 8/2007 | Gillingham et al. |
| 2007/0209343 A1 | 9/2007 | Cuvelier |
| 2009/0199520 A1 | 8/2009 | Mills et al. |
| 2010/0107577 A1 | 5/2010 | Krisko et al. |
| 2010/0115897 A1 | 5/2010 | Krisko et al. |
| 2010/0186353 A1 | 7/2010 | Ackermann et al. |

FOREIGN PATENT DOCUMENTS

| | | |
|---|---|---|
| FR | 2 034 160 | 12/1970 |
| GB | 703823 | 2/1954 |
| GB | 2106634 A | 4/1993 |
| JP | 60-112320 | 7/1985 |
| JP | 1171615 | 7/1989 |
| JP | 9-234321 | 9/1997 |
| WO | WO 97/40908 | 11/1997 |
| WO | WO 97/40910 | 11/1997 |
| WO | WO 97/40917 | 11/1997 |
| WO | WO 97/41939 | 11/1997 |
| WO | WO 00/50149 | 8/2000 |
| WO | WO 2004/020075 | 3/2004 |
| WO | WO 2005/037408 A1 | 4/2005 |
| WO | WO 2005/107924 | 11/2005 |
| WO | WO 2008/067029 | 6/2008 |
| WO | WO 2009/106588 A1 | 9/2009 |
| WO | WO 2009/106590 A1 | 9/2009 |

OTHER PUBLICATIONS

Complaint with Exhibits A-F; *Donaldson Company, Inc.* v. *Mann+Hummel USA, Inc.* and *Mann+Hummel GmbH*, United States District Court, District of Minnesota, Case 0:07-cv-04136 MJD-SRN, filed Oct. 1, 2007.

Notice of Claims Involving Patents; *Donaldson Company, Inc.* v. *Mann+Hummel USA, Inc.* and *Mann+Hummel GmbH*, United States District Court, District of Minnesota, Case 0:07-cv-04136 MJD-SRN, filed Oct. 1, 2007.

Rule 7.1 Disclosure Statement of Plaintiff *Donaldson Company, Inc.*; *Donaldson Company, Inc.* v. *Mann+Hummel USA, Inc.* and *Mann+Hummel GmbH*, United States District Court, District of Minnesota, Case 0:07-cv-04136 MJD-SRN, filed Oct. 1, 2007.

Civil Cover Sheet; *Donaldson Company, Inc.* v. *Mann+Hummel USA, Inc.* and *Mann+Hummel GmbH*, United States District Court, District of Minnesota, Case 0:07-cv-04136 MJD-SRN, filed Oct. 1, 2007.

Jaroszczyk et al.; Recent Advances in Engine Air Cleaners Design and Evaluation; 2004; 17 pages.

Thomas G. Miller, Statement Regarding Product; Dec. 23, 2010; 7 pages.

Thomas G. Miller, Statement Regarding Product; Dec. 23, 2010; 10 pages.

FILTER ARRANGEMENT AND METHOD

This application is being filed on 23 Aug. 2007, as a National Stage of PCT International Patent application No. PCT/US2006/007078 in the name of Donaldson Company, Inc., a U.S. national corporation, applicant for the designation of all countries except the US, and Wade Mosset, Jack Kuhn, Sue Brady, Don Larson, and Wayne R. W. Bishop, all citizens of the US, applicants for the designation of the US only, and claims priority to U.S. Provisional Application Ser. No. 60/657,116, filed Feb. 28, 2005.

FIELD OF THE DISCLOSURE

The present disclosure relates to filter media for use in filtering gases. The disclosure particularly relates to media packs that use z-filter media which comprises a corrugated media sheet secured to facing sheet, formed into a media pack. More specifically, the disclosure relates to such media packs and their inclusion in serviceable filter cartridge arrangements, typically for use in air cleaners. Air cleaner arrangements, methods of assembly and use, and systems of use are also described.

BACKGROUND

Fluid streams, such as air, can carry contaminant material therein. In many instances, it is desired to filter some or all of the contaminant material from the fluid stream. For example, air flow streams to engines (for example combustion air) for motorized vehicles or for power generation equipment, gas streams to gas turbine systems and air streams to various combustion furnaces, carry particulate contaminant therein that should be filtered. It is preferred for such systems, that selected contaminant material be removed from (or have its level reduced in) the fluid. A variety of fluid filter (air or liquid filter) arrangements have been developed for contaminant rejection. However, continued improvements are sought.

SUMMARY

According to a portion of the present disclosure, features useable in preferred filter cartridges, such as air filter cartridges are provided. The features can be used together to provide a preferred filter cartridge, however some advantageous cartridges can be constructed to use only selected ones of the features. In addition, methods of construction and use are provided.

A filter arrangement is provided including a filter media pack having a side wall. A ring is oriented around and against the side wall of the filter media pack arrangement. The ring includes a band having an interior surface oriented against the side wall of the filter media pack arrangement and an opposite exterior surface. A first seal member is secured to the exterior surface of the band. The first seal member is oriented radially from the filter media pack arrangement. The filter media pack arrangement includes a corrugated media sheet secured to a facing sheet formed into a media pack. The filter media pack arrangement has an inlet flow face and an opposite outlet flow face.

In another aspect, an air cleaner is provided including a housing with a filter element as characterized above operably installed therein.

In another aspect, a method of installing a filter element into an air cleaner is provided. The method includes providing a filter element of the type as characterized above, and inserting the filter element into a housing body until first and second seals are formed between the filter element and the housing body. The first seal is a radial seal between and against the housing body and the exterior surface of the ring.

In another aspect, a method of servicing an air cleaner is provided. The method includes removing a cover from a housing body to expose a filter element operably installed in the housing body. The method includes grasping a flange extending radially from the filter element. Next, there is a step of moving the filter element to release first and second radial seals between the filter element and the housing body. There is further a step of removing the filter element from the housing body.

DETAILED DESCRIPTION

A. General System of Use

Figure 1:
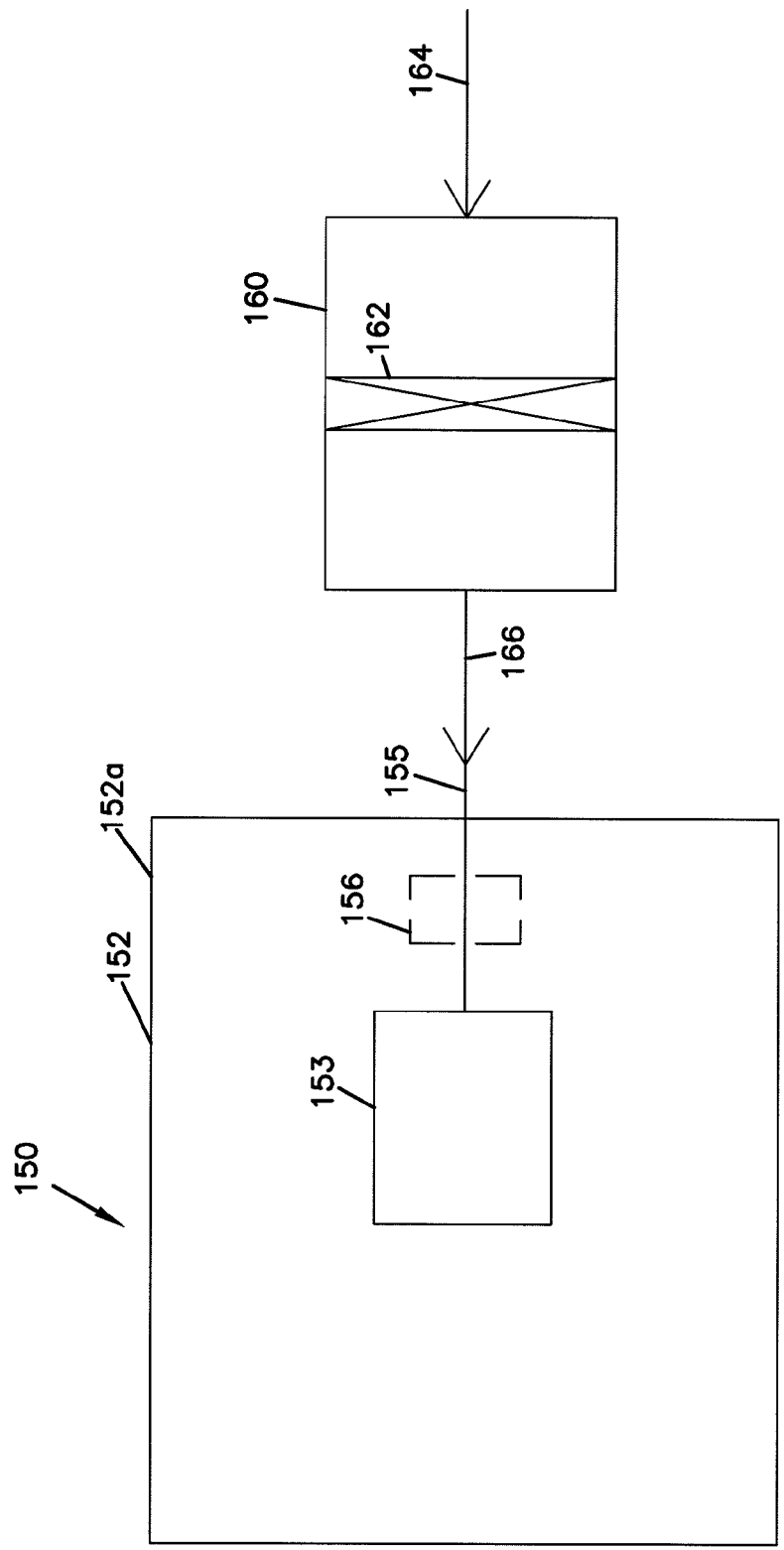
FIG. 1 is a schematic illustration of a system utilizing filter arrangements constructed according to principles of this disclosure.

The principles and arrangements described herein are useable in a variety of systems. One particular system is depicted schematically in FIG. 1, generally at 150. In FIG. 1, equipment 152, such as a vehicle 152a having an engine 153 with some defined rated air flow demand, for example in the range of 50 cfm to 2000 cfm (cubic feet per minute) (i.e., 1.4-57 cubic meters/minute) is shown schematically. Although alternatives are possible, the equipment 152 may, for example, comprise a bus, an over-the-highway truck, an off-road vehicle, a tractor, a light-duty or medium-duty truck, or a marine vehicle such as a power boat. The engine 153 powers the equipment 152 upon fuel combustion. In FIG. 16, air flow is shown drawn into the engine 153 at an air intake at region 155. An optional turbo 156 is shown in phantom, as optionally boosting the air intake to the engine 153. The turbo 156 is shown downstream from an air cleaner 160, although alternate arrangement are possible.

The air cleaner 160 has a serviceable (i.e., removable and replaceable) filter cartridge 162 and is shown in the air inlet stream to the engine 153. In general, in operation, air is drawn in at arrow 164 into the air cleaner 160 and through the filter cartridge 162. Upon passage through the air cleaner 160, selected particles and contaminants are removed from the air. The cleaned air then flows downstream at arrow 166 into the intake 155. From there, the air flow is directed into the engine 153.

In a typical air cleaner 160, the filter cartridge 162 is a serviceable component. That is, the cartridge 162 is removable and replaceable within the air cleaner 160. This allows the cartridge 162 to be serviced, by removal and replacement, with respect to remainder of air cleaner 160, when the cartridge 162 becomes sufficiently loaded with dust or other contaminant, to require servicing.

B. Z-Filter Media Configurations, Generally

The filter cartridge 162 comprises fluted filter media, or Z-filter media. Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and Des. 437,401, each of which is incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235,195 and 6,179,890. In certain other arrangements, some non-coiled sections of fluted media secured to facing media, are stacked on one another, to create a filter construction. An example of this is described in FIG. 11 of U.S. Pat. No. 5,820,646, incorporated herein by reference.

For specific applications as described herein, coiled arrangements are preferred. Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, each of which is incorporated herein by reference. The resulting coiled arrangement generally has, as the outer surface of the media pack, a portion of the facing sheet.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by such techniques as corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid cleaner. In some instances, each of the inlet flow end and outlet flow end will be generally flat or planar, with the two parallel to one another. However, variations from this, for example non-planar faces are possible.

A straight through flow configuration (especially for a coiled media pack) is, for example, in contrast to serviceable filter cartridges such as cylindrical pleated filter cartridges of the type shown in U.S. Pat. No. 6,039,778, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992.

The term "z-filter media construction" and variants thereof as used herein, without more, is meant to refer to any or all of: a web of corrugated or otherwise fluted media secured to facing media with appropriate sealing to allow for definition of inlet and outlet flutes; or, such a media coiled or otherwise constructed or formed into a three dimensional network of inlet and outlet flutes; and/or, a filter construction including such media.

Figure 2:
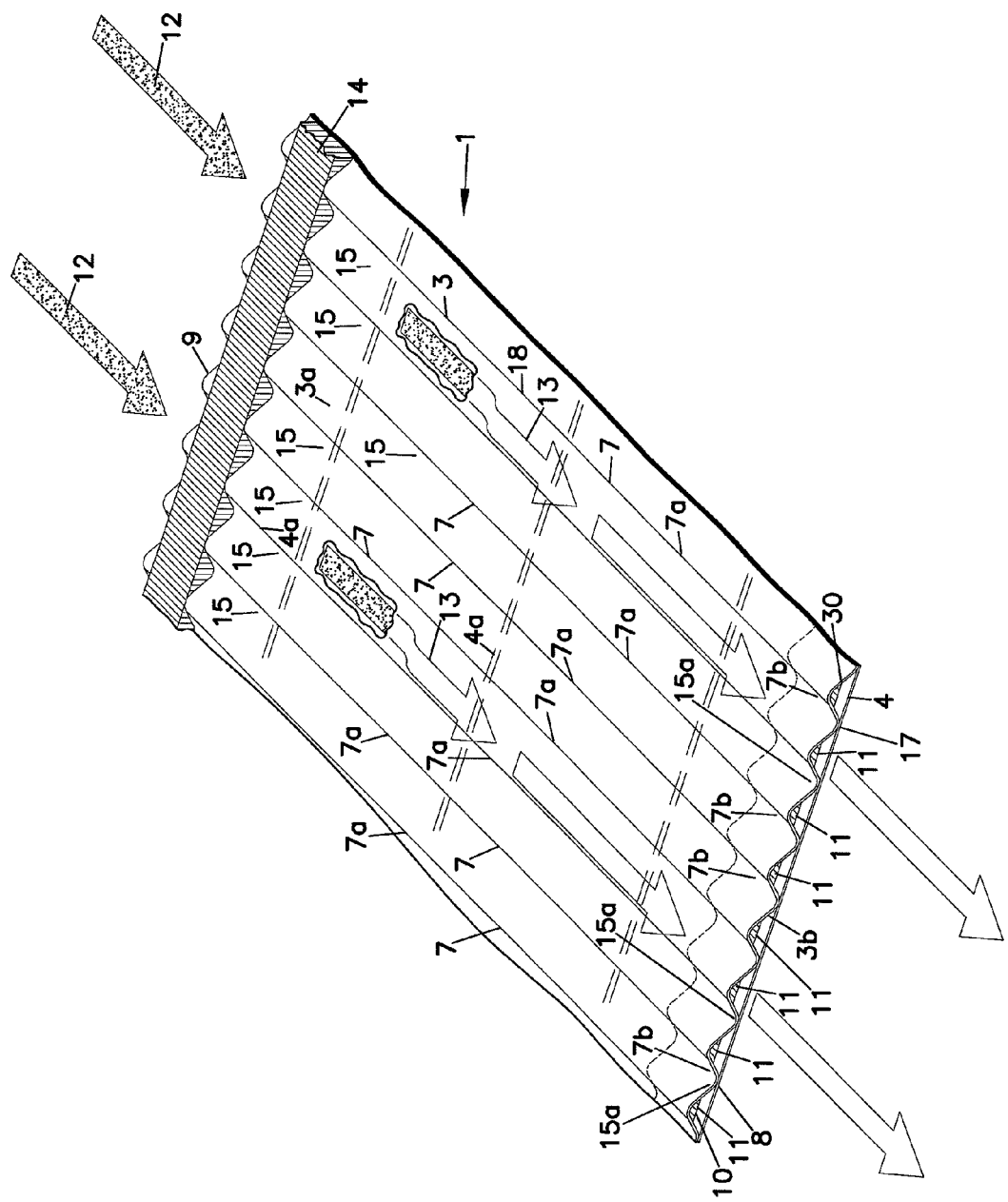
FIG. 2 is a schematic, perspective view depicting filter media useable in filter arrangements constructed according to principles of this disclosure.

In FIG. 2, an example of media 1 useable in z-filter media is shown. The media 1 is formed from a corrugated (fluted) sheet 3 and a facing sheet 4.

In general, the corrugated sheet 3, FIG. 2, is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 2 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 2, for the corrugated sheet 3, is that at approximately a midpoint 30 between each trough and each adjacent ridge, along most of the length of the flutes 7, is located a transition region where the curvature inverts. For example, viewing back side or face 3a, FIG. 4, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the straight segment 30.)

A characteristic of the particular regular, curved, wave pattern corrugated sheet 3 shown in FIG. 2, is that the individual corrugations are generally straight. By "straight" in this context, it is meant that through at least 70% (typically at least 80%) of the length between edges 8 and 9, the ridges 7a and troughs 7b do not change substantially in cross-section. The term "straight" in reference to corrugation pattern shown in FIG. 2, in part distinguishes the pattern from the tapered flutes of corrugated media described in FIG. 1 of WO 97/40918 and PCT Publication WO 03/47722, published Jun. 12, 2003, each of which is incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 2 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

Adjacent edge 8 the sheets 3, 4 are sealed to one another, for example by sealant, in this instance in the form of a sealant bead 10, sealing the corrugated (fluted) sheet 3 and the facing sheet 4 together. Bead 10 will sometimes be referred to as a "single facer" bead, when it is applied as a bead between the corrugated sheet 3 and facing sheet 4, to form the single facer or media strip 1. Sealant bead 10 seals closed individual flutes 11 adjacent edge 8, to passage of air therefrom.

Adjacent edge 9, is provided sealant, in this instance in the form of a seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus, bead 14 will form a seal between a back side 17 of facing sheet 4, and side 18 of the corrugated sheet 3. The bead 14 will sometimes be referred to as a "winding bead" when it is applied as the strip 1 is coiled into a coiled media pack. If the media 1 were cut in strips and stacked, instead of coiled, bead 14 would be a "stacking bead."

In some applications, the corrugated sheet 3 is also tacked to the facing sheet 4 at various points along the flute length, as shown at lines 4a.

Referring to FIG. 2, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction. However, in typical air filter applications, at one end or face of the media pack unfiltered air flow in, and at an opposite end or face the filtered air flow out, with no unfiltered air flow through the pack or between the faces.

For the particular arrangement shown herein in FIG. 2, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin, During the corrugation process, the media can be heated to above the glass transition point of the resin. When the resin then cools, it will help to maintain the fluted shapes.

The media of the corrugated sheet 3, facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Figure 3:
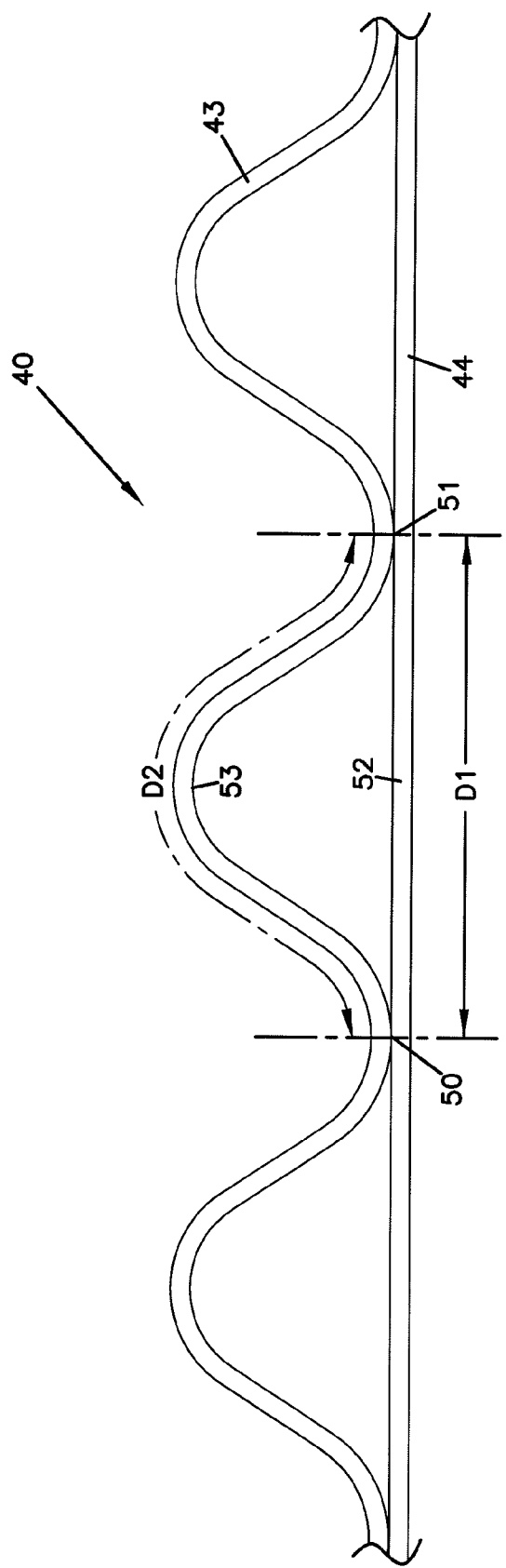
FIG. 3 is a schematic, cross-sectional view of a portion of the media depicted in FIG. 2.

Attention is now directed to FIG. 3, in which a z-filter media construction 40 utilizing a regular, curved, wave pattern corrugated sheet 43, and a facing (in this instance non-corrugated) sheet 44, is depicted. The distance D1, between points 50 and 51, defines the extension of facing media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0 time D1, inclusive. One particularly convenient arrangement for air filters has a configuration in which D2 is about 1.25–1.35×D1. Such media has, for example, been used commercially in Donaldson Powercore™ Z-filter arrangements. Herein the ratio D2/D1 will sometimes be characterized as the flute/flat ratio or media draw for the corrugated (fluted) media.

Figure 6:
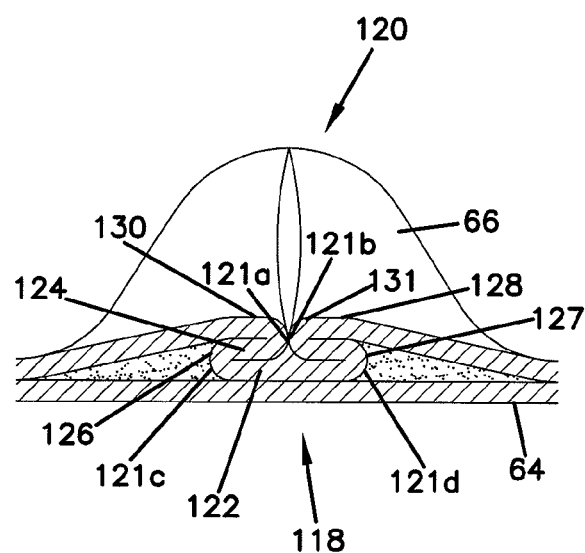
FIG. 6 is a cross-sectional view of an optional end dart for media flutes useable in arrangements according to principles of this disclosure.

In the corrugated cardboard industry, various standard flutes have been defined. For example the standard E flute, standard X flute, standard B flute, standard C flute and standard A flute. FIG. 6, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 4.

Figure 4:
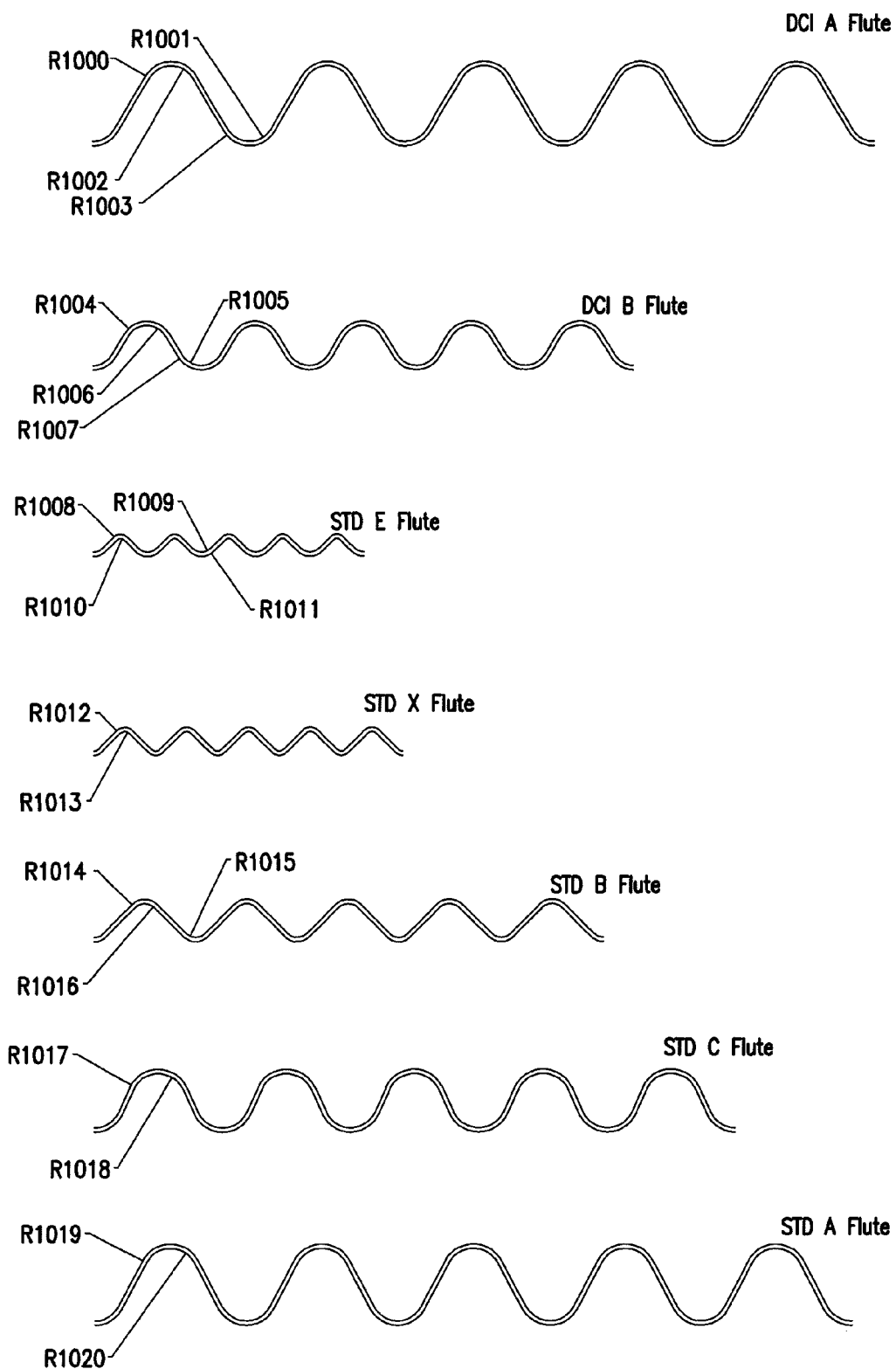
FIG. 4 is a schematic view of examples of various corrugated media definitions.

TABLE A (Flute definitions for FIG. 4)

| | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm); |
| Std. C Flute: | Flute/flat = 1.46:1; The Radii (R) are as follows: R1017 = .0720 inch (1.829 mm); R1018 = .0620 inch (1.575 mm); |
| Std. A Flute: | Flute/flat = 1.53:1; The Radii (R) are as follows: R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

C. Manufacture of Coiled Media Configurations Using Fluted Media, Generally

Figure 5:
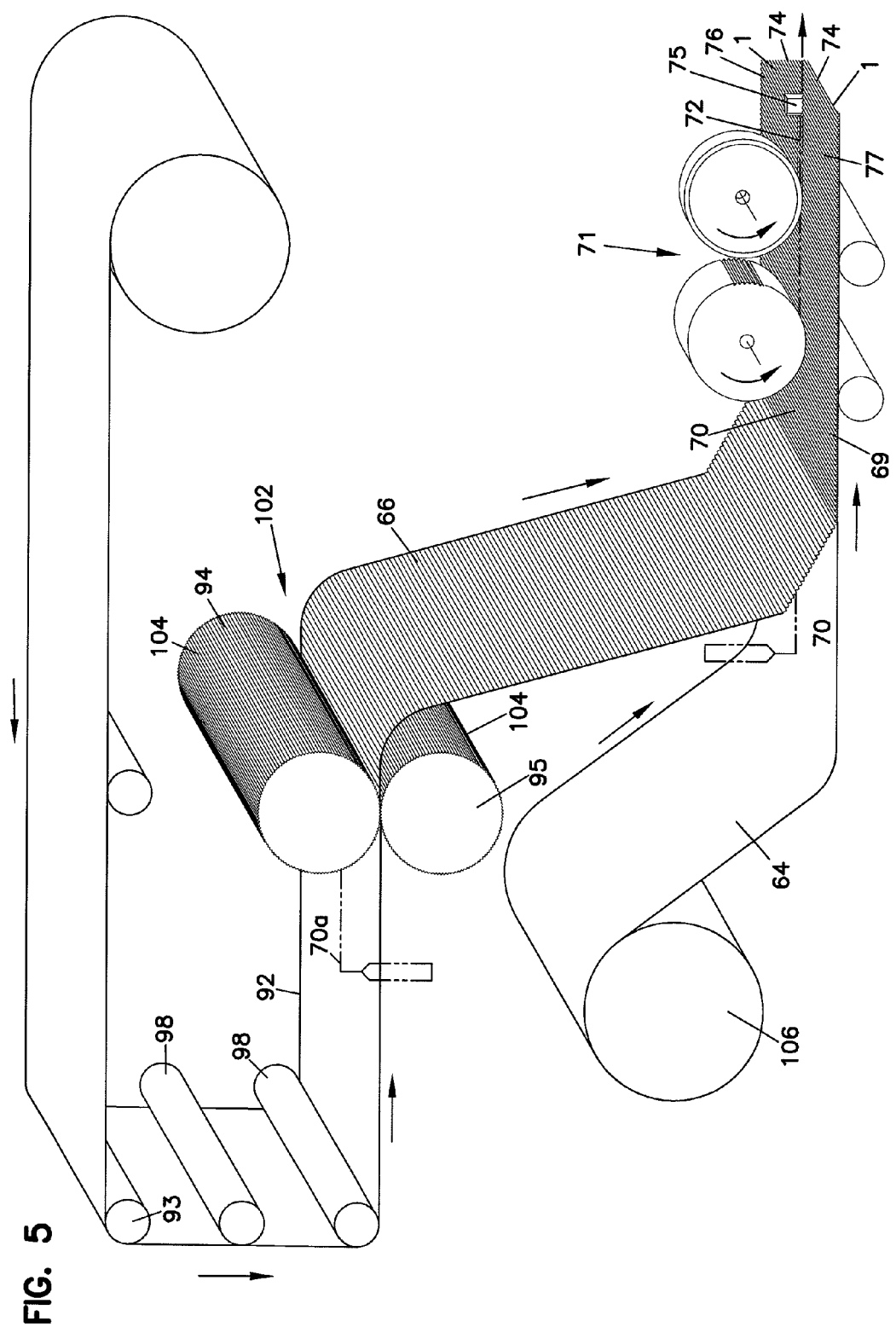
FIG. 5 is a schematic, perspective view of a process for manufacturing filter media useable in filter arrangements constructed according to principles of this disclosure.

In FIG. 5, one example of a manufacturing process for making a media strip corresponding to strip 1, FIG. 2 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 2. An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Also, if tack beads or other tack connections 4a, FIG. 2, are used, they can be made, as the sheets 64, 66 are brought together.

Techniques for conducting a process as characterized with respect to FIG. 2 are described in PCT WO 04/007054, published Jan. 22, 2004, incorporated herein by reference.

Still in reference to FIG. 5, before the z-filter media 74 is put through the darting station 71 and eventually slit at 75, it must be formed. In the schematic shown in FIG. 5, this is done by passing a sheet of media 92 through a pair of corrugation rollers 94, 95. In the schematic shown in FIG. 5, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 5, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 are secured together by adhesive or by other means (for example by sonic welding).

Referring to FIG. 5, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

The type of corrugation provided to the corrugated media is a matter of choice, and will be dictated by the corrugation or corrugation teeth of the corrugation rollers 94, 95. One preferred corrugation pattern will be a regular curved wave pattern corrugation of straight flutes, as defined herein above. A typical regular curved wave pattern used, would be one in which the distance D2, as defined above, in a corrugated pattern is at least 1.2 times the distance D1 as defined above. In one preferred application, typically D2=1.25–1.35×D1. In some instances the techniques may be applied with curved wave patterns that are not "regular," including, for example, ones that do not use straight flutes.

As described, the process shown in FIG. 5 can be used to create the center darted section 72. FIG. 6 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 522 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 6, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 6. The term "inwardly directed" is meant to refer to the fact that the fold line or crease line of each crease 121a, 121b, is directed toward the other.

In FIG. 6, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 6. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 6. That is, they are not meant to be otherwise indicative of direction when the fold 120 is oriented in an actual product for use.

Based upon these characterizations and review of FIG. 6, it can be seen that a preferred regular fold arrangement 118 according to FIG. 6 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements folded against, the inverted ridge.

Techniques for providing the optional dart described in connection with FIG. 6, in a preferred manner, are described in PCT WO 04/007054, incorporated herein by reference. Techniques for coiling the media, with application of the winding bead, are described in PCT application US 04/07927, filed Mar. 17, 2004, incorporated herein by reference.

Techniques described herein are particularly well adapted for use with media packs that result from coiling a single sheet comprising a corrugated sheet/facing sheet combination, i.e., a "single facer" strip. Certain of the techniques can be applied with arrangements that, instead of being formed by coiling, are formed from a plurality of strips of single facer.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927, each of which is incorporated herein by reference. Other useable shapes are obround, some examples of obround being oval shape. In general oval shapes have opposite curved ends attached by a pair of opposite sides. In some oval shapes, the opposite sides are also curved. In other oval shapes, sometimes called race-track shapes, the opposite sides are generally straight. Race-track shapes are described for example in PCT WO 04/007054 and PCT application US 04/07927, each of which is incorporated herein by reference.

Another way of describing the peripheral or perimeter shape is by defining the perimeter resulting from taking a cross-section through the media pack in a direction orthogonal to the winding axis of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack. Examples of such media pack arrangements are shown in U.S. Provisional Application 60/578,482, filed Jun. 8, 2004, incorporated herein by reference.

The flute seals (for example from the single facer bead, winding bead or stacking bead) can be formed from a variety of materials. In various ones of the cited and incorporated references, hot melt or polyurethane seals are described as possible for various applications. Such materials are also useable for arrangements as characterized herein.

When the media is coiled, generally a center of the coil needs to be closed, to prevent passage of unfiltered air between the flow faces; i.e., through the media pack. Some approaches to this are referenced below. Others are described in U.S. Provisional 60/578,482, filed Jun. 8, 2004; and U.S. Provisional 60/591,280, filed Jul. 26, 2004, each of which is incorporated herein by reference. The media chosen for the corrugated sheet and facing sheet can be the same or different. Cellulose fiber, synthetic fiber or mixed media fiber materials can be chosen. The media can be provided with a fine fiber layer applied to one or more surface, for example in accord with U.S. Pat. No. 6,673,136, issued Jan. 6, 2004, incorporated herein by reference. When such material is used on only one side of each sheet, it is typically applied on the side(s) which will form the upstream side of inlet flutes.

D. The Arrangements of FIGS. 7-15

Figure 7:
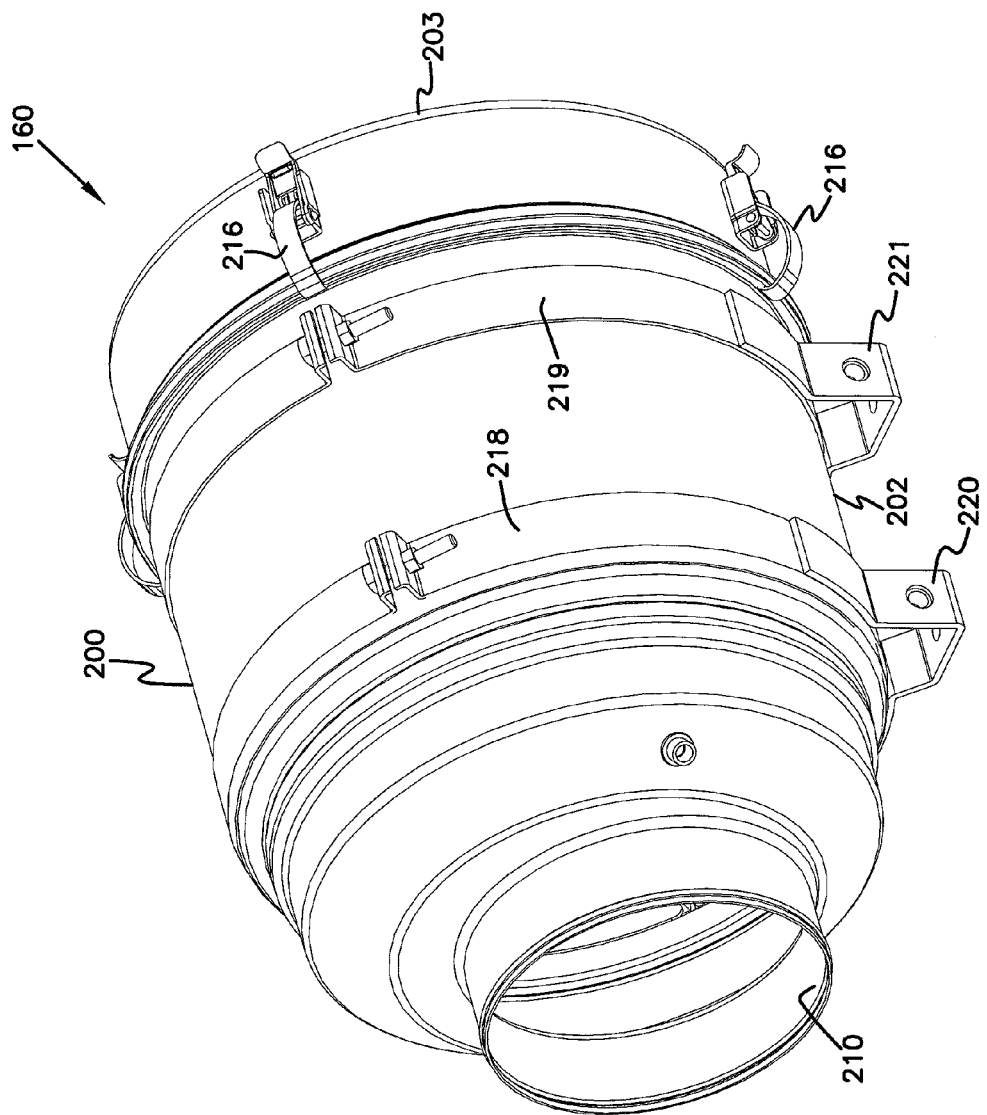
FIG. 7 is a perspective view of an air cleaner constructed according to principles of this disclosure.

FIG. 7 illustrates an air cleaner 160 constructed according to principles of this disclosure. The air cleaner 160 includes a housing 200 with filter element 162 operably mounted therein. The housing 200 preferably includes a body member 202 and a removable cover 203. The filter element 162 is selectively removable and replaceable from the housing 200 by removing the cover 203 from the body member 202 providing access to the filter element 162.

The air cleaner 160 is useable for cleaning fluid, such as gas, in particular, air. The filter element 162 is configured to permit straight through flow. That is, the fluid flows directly through the filter element 162, entering at an inlet face 204 (FIG. 8) and exiting in a same direction at an opposite outlet face 205 (FIG. 8) without turning a corner. The filter element 162 includes filter media 1, as described above in Section B, and is shown in FIG. 2.

Figure 8:
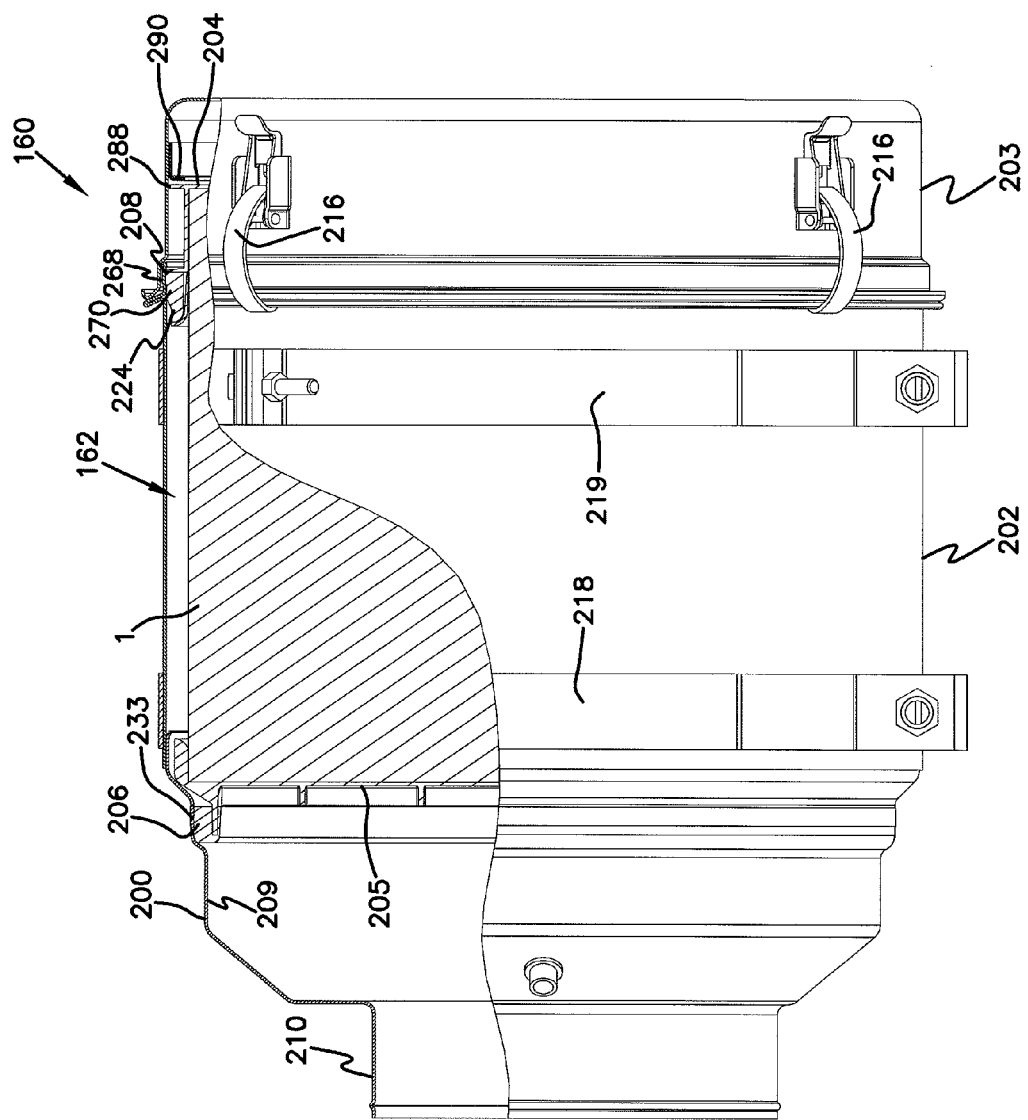
FIG. 8 is a side elevational view of the air cleaner of FIG. 7 and including a portion broken away to show a cross-sectional view of a filter element operably installed therein.

As can be seen in FIG. 8, the filter element 162 includes a primary seal 206, which aids in inhibiting leakage between the filter element 162 and the body member 202 of the housing 200. The filter element 162 also includes another seal 208, which is oriented upstream of the primary seal 206 and aids in inhibiting leakage between the filter element 162 and the body member 202. The seal 208 also helps to prevent an accumulation of dust between the element 162 and the housing 200 upstream of the primary seal 206.

The air cleaner 160 may include an optional safety element (not pictured). The safety element would be oriented downstream of the filter element 162 in the body member 202 at location 209. The safety element would help to protect downstream components in the filtration system, in case of failure of the filter element 162. The safety element also would protect downstream components during servicing of the air cleaner 160. By "servicing", it is meant when the cover 203 is removed from the body member 202, and the filter element 162 is removed from the body member 202 and replaced with a new filter element.

Figure 9:
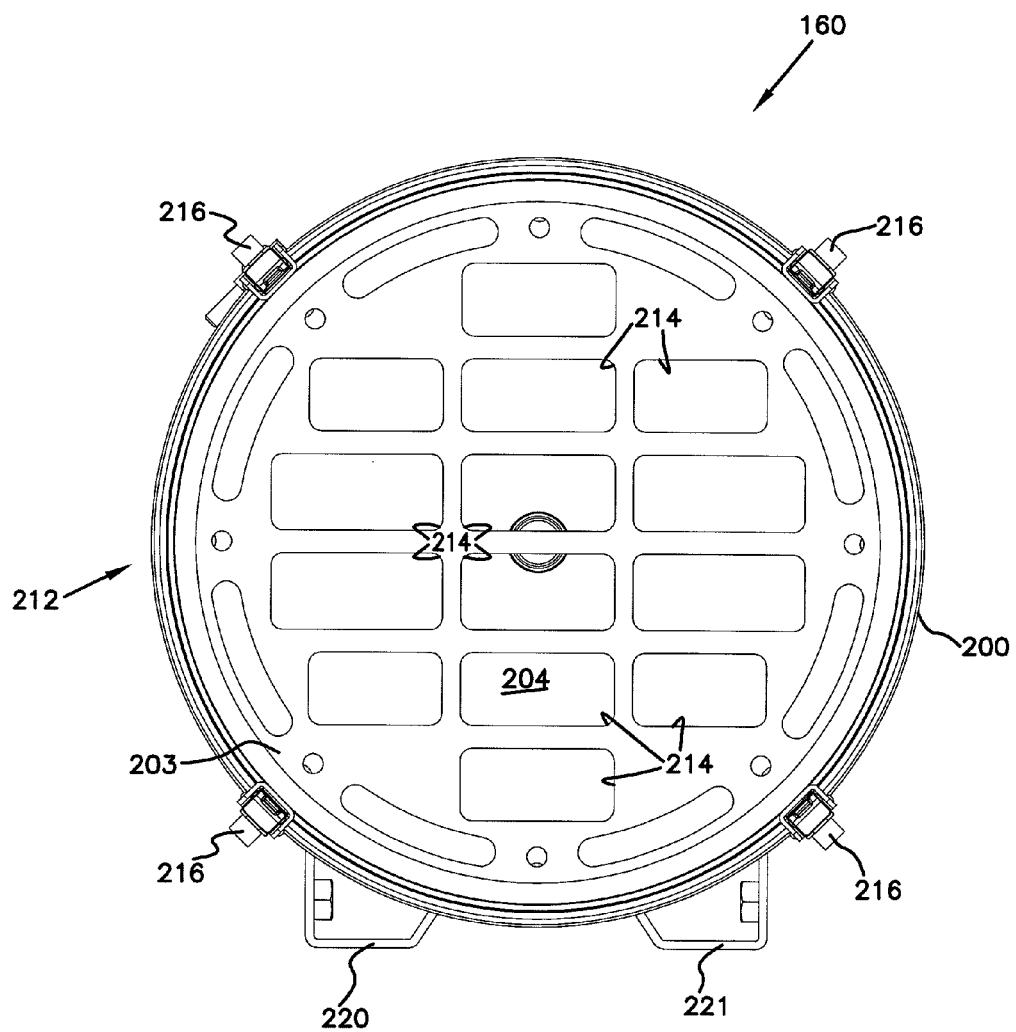
FIG. 9 is an end elevational view of the air cleaner depicted in FIG. 7.

Other features visible in FIGS. 7-9 include an outlet tube 210 on the body member 202, and an inlet grid 212 (FIG. 9) on the cover 203. In particular, the inlet grid 212 on the cover 203 defines a plurality of elongated slots 214 to receive incoming gas to be directed through the filter element 162. The grid 212 helps to remove large particulates, such as leaves and insects from the gas stream being directed into the filter element 162.

The air cleaner 160 includes a plurality of clamps or latches 216, such as over-center latches. The latches 216 secure the cover 203 to the body member 202. The latches 216 allow for selective removal of the cover 203 from the body member 202, in order to service the air cleaner 160. In FIG. 9, it can be seen that in the illustrated embodiment, the air cleaner 160 has four latches 216.

Another feature of the air cleaner 160 viewable in FIGS. 7-9 includes mounting bands 218 and 219. The mounting bands 218, 219 are adjustable around the housing 200 to allow the air cleaner 160 to be mounted in several different orientations. The mounting bands 218, 219 include mounting flanges 220, 221 that permit the receipt of bolts or other fasteners to allow the air cleaner 160 to be mounted onto the system, such as equipment 152 (FIG. 1).

Figure 10:
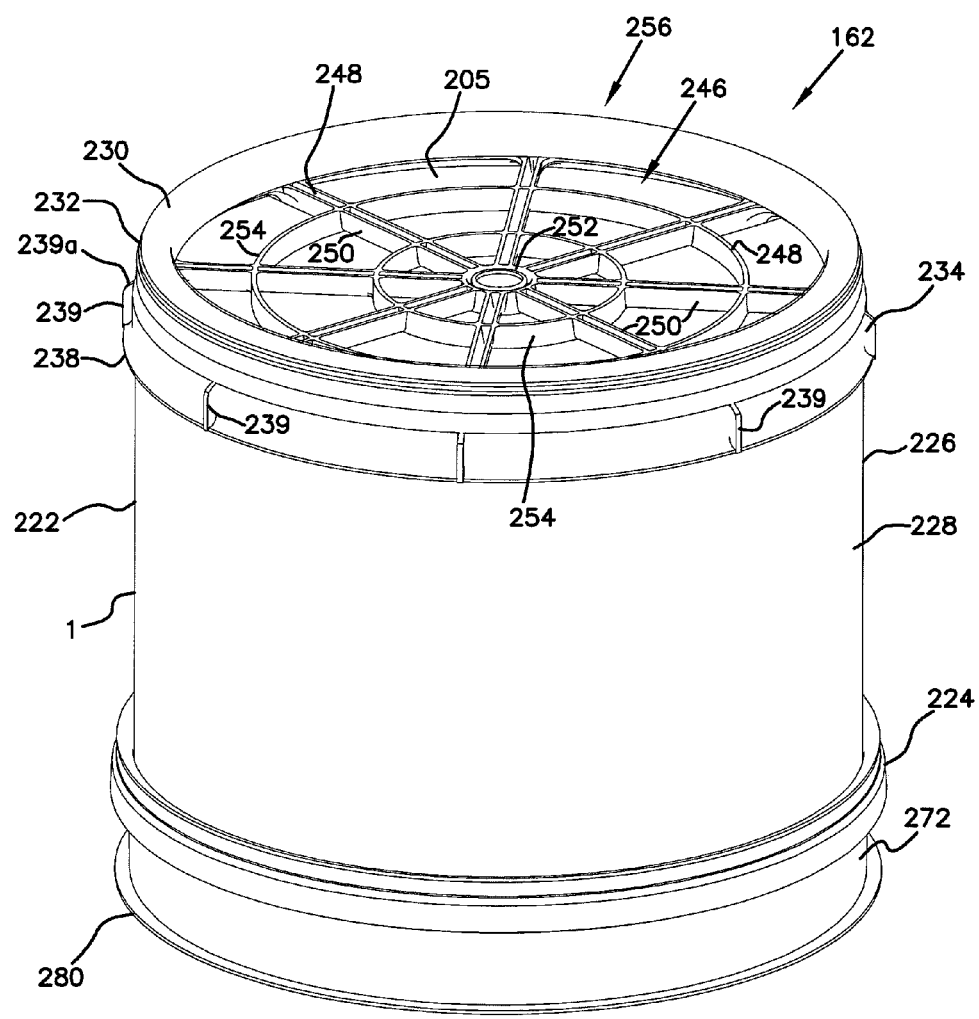
FIG. 10 is a perspective view of the filter element useable in the air cleaner of FIG. 7.
Figure 11:
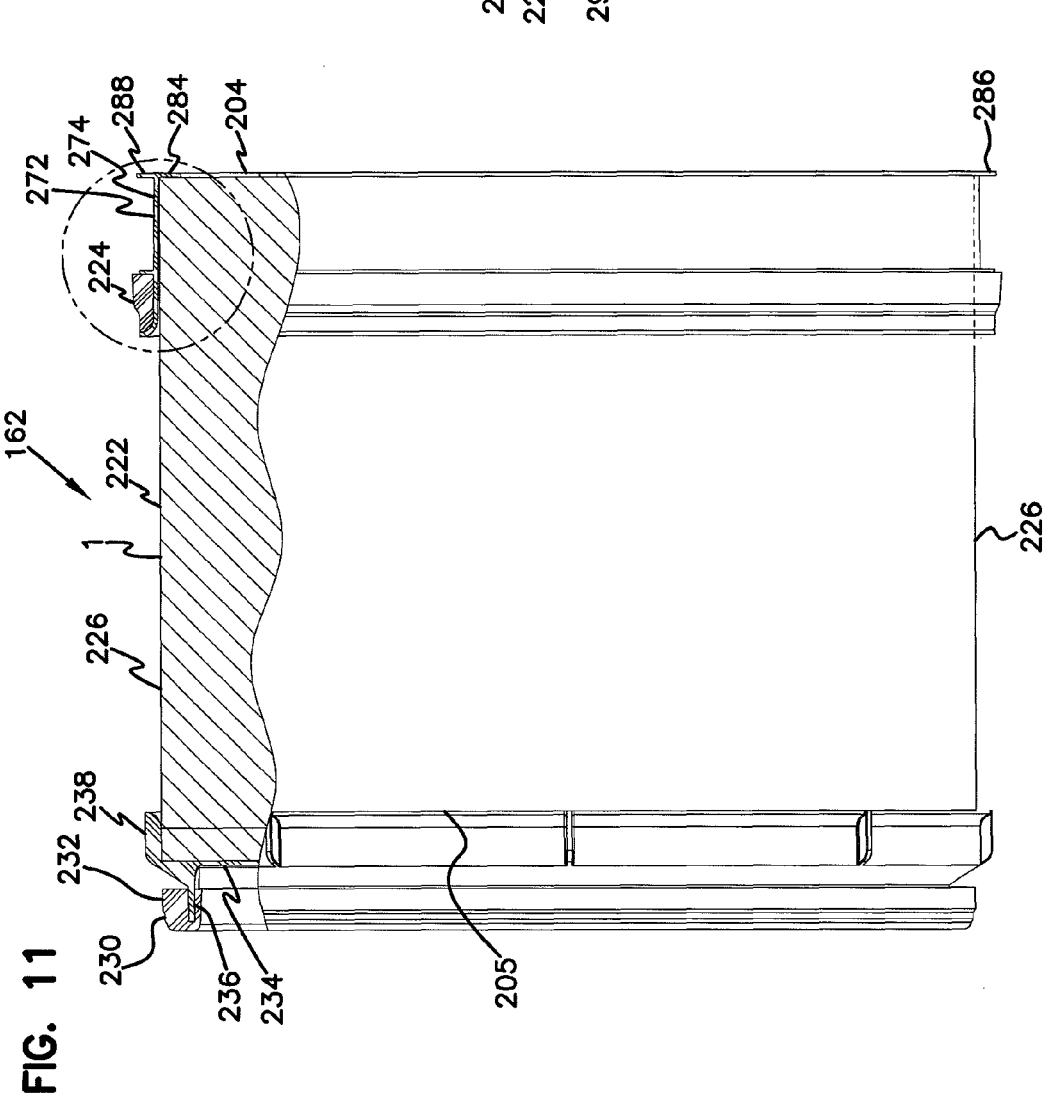
FIG. 11 is a side elevational view of the filter element of FIG. 10 and depicting a partial cross-sectional view.

In reference now to FIG. 10, one embodiment of the filter element 162 is illustrated in perspective view. FIG. 10 illustrates a filter arrangement, or filter element 162 including a filter media pack arrangement 222. The filter media pack arrangement 222 includes Z-filter media 1, as characterized in Section B above. The outlet flow face 205 can be seen in FIG. 10. The inlet flow face 204, in the particular embodiment illustrated, is shown as being planar and generally parallel to the outlet flow face 205 (FIG. 11). In FIG. 10, a first seal member 224 can be seen circumscribing the filter media pack arrangement 222. The filter media pack arrangement has a side wall 226 that extends between the inlet flow face 204 and the outlet flow face 205. In the embodiment illustrated in FIG. 10, the filter element 162 is cylindrical, preferably a coiled construction 228. The first seal member 224 is oriented to circumscribe the media pack arrangement 222 and is oriented radially therefrom. The first seal member 224 is oriented to result in the seal 208 (FIG. 8) between the filter element 162 and the air cleaner housing 200.

The particular embodiment illustrated of the filter element 162 further shows a second seal member 230. The second seal member 230 results in the primary seal 206 (FIG. 8).

Figure 15:
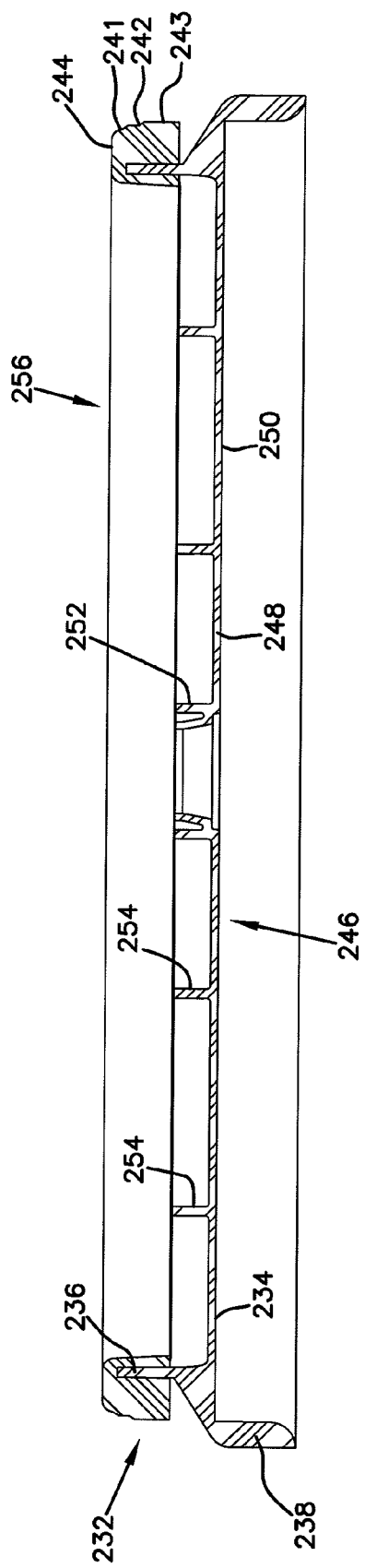
FIG. 15 is a cross-sectional view of a frame member and seal member utilized with the filter element of FIG. 10.

In the particular one depicted in FIG. 10, the seal member 230 is a radial seal member 232, configured to result in a radially directed seal 233 (FIG. 8) with the housing body 202. In this particular embodiment, the radial seal member 230 is supported by a frame construction 234 (FIGS. 10, 11 and 15). The frame construction 234 includes an extension 236 (FIG. 15) that projects or extends axially from the outlet face 205. The frame construction 234 also includes a skirt or band 238 that is used to secure the filter media 1 to remaining portions of the frame construction 234. Other arrangements are useable, including securing the radial seal member 230 to the media pack arrangement 222 by directly molding the seal member 230 onto the media pack arrangement 222 with urethane, for example, instead of using the skirt 238. This technique is described in commonly assigned U.S. provisional patent application 60/532,783, filed Dec. 22, 2003, incorporated herein by reference in its entirety.

In the embodiment shown, the band 238 includes a plurality of skates or ribs. In the illustrated embodiment, the ribs 239 project radially from the band 238 and are generally oriented in a longitudinal direction, parallel to a central axis of the filter element 162. The ribs 239 help to guide the element 162 in place within the housing 200. In some housings, there may be bumps or other interruptions due to how the housing is constructed (e.g., weld joints, etc.). The ribs 239 have a tapered end 239a, which helps to guide the element 162 passed any such bumps, ridges, or interruptions. In the embodiment shown, there are at least five ribs 239, preferably eight ribs 239, evenly spaced circumferentially about the filter element 162.

The particular radial seal member 232 is shown, enlarged, in FIG. 15. The preferred seal member 232 depicted has a stepped cross-sectional configuration of increasing outermost dimensions and defines a plurality of progressively larger steps, in this case, three steps 241, 242, 243 from an end tip 244 and in the direction toward the rest of the filter element 162. The smallest step 241 allows for easy insertion of the filter element 162 into the housing. The largest step 243 ensures that a tight radial seal 232 (FIG. 8) is formed. In preferred cases, the radial seal member 232 is made from a polyurethane foam material having "as-molded" density of no greater than 25 lbs per cubic foot, typically about 11-22 lbs. per cubic foot. This material permits the seal member 232 to be soft and compressible, such that the seal member 232 can be compressed between the extension 236 and a sealing surface of the housing in which it is installed. In preferred applications, the seal member 232 is compressed between about 15% and 40% of its thickness. One example of radial seal member 232 and the manner in which it is used to seal against a housing is described in detail in U.S. Pat. No. 6,190,432, which is incorporated herein by reference.

In the embodiment shown, the radial seal member 232 will be supported by the frame construction 234 to help keep the seal member 232 properly oriented against the sealing surface of the housing. The frame construction 234 preferably includes a truss system 246 (FIGS. 10 and 15) to help support the seal member 232. In general, the truss system 246 includes a plurality of struts or support members 248 arranged and configured to provide structural support and take the forces exerted by the compression of the seal member 232 against the extension 236. The struts or support members 248 can be arranged in a variety of configurations. In the particular arrangement shown in FIG. 10, the truss system 246 includes a plurality of spokes 250 symmetrically arranged over the outlet face 205, radially extending from a central hub 252 terminating at the extension 236 and the band 238. The truss system 246 further includes arched members 254 extending between and connecting each of the spokes 250. The truss system 246 forms an outlet grid 256 that is useful in inhibiting a "telescoping" effect of the media 1, when arranged in a coil.

Turning now to the first seal member 224, it can be seen in FIG. 8 how the first seal member 224 is arranged relative to the filter element 162 and the housing 200 to provide seal 208 therebetween. An enlarged, schematic view of this seal member 224 is shown in FIG. 14.

Figure 14:
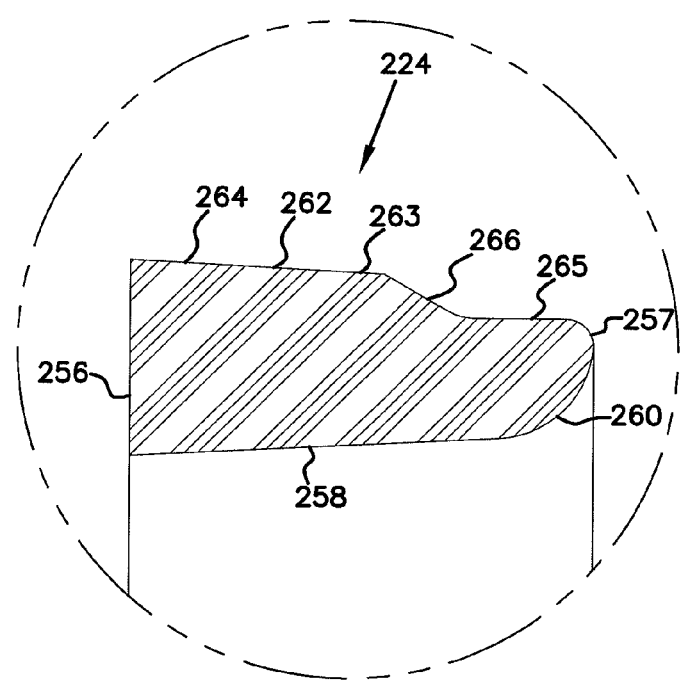
FIG. 14 is an enlarged, cross-sectional view of one of the seal members utilized with the filter element of FIG. 10.

Turning now to FIG. 14, one embodiment of the first seal member 224 is illustrated in cross-sectional view. The particular embodiment shown in FIG. 14 of the seal member 224 includes a first end 256 and an opposite, second end 257. Extending between the first end 256 and second end 257 is an inner surface 258. The inner surface 258 is generally straight for about 80% of its length, and has a radiused portion 260 adjacent to the second end 257. The seal member 224 further includes an exterior surface 262 opposite of the inner surface 258. The exterior surface 262 has a profile 263 that is tapered or stepped. The tapered or stepped profile 263 allows for easier insertion of the filter element 162 and formation of seal 208 (FIG. 8).

In the embodiment shown, the stepped profile 263 includes a step 264 and a step 265. Between the step 264 and step 265 is a transition region 266. Specifically, in the embodiment shown, the step 264 has an overall thickness that is greater than the step 265. The transition region 266 is angled or slanted between the larger step 264 and smaller step 265.

When operably installed in the air cleaner housing 200, the filter element 162 with the seal member 224 forms a radial seal 268 (FIG. 8) by compression of the seal member 224 against an inner sealing surface 270 (FIG. 8) of the body member 202. In particular, the exterior surface 262, specifically, the step 264, is compressed against the inner sealing surface 270 (FIG. 8) of the body member 202 to form the radial seal 268 (FIG. 8). The stepped profile 263 allows for easier insertion of the filter element 162 into the housing 200. In the orientation illustrated, the second end 257 with the smaller step 265 is oriented such that the second end 257 will be the leading edge that is inserted into the housing 200 when installing or servicing the air cleaner 160.

Many different arrangements for the seal member 224 are useable. Example geometric relationships for the seal member 224 include having the step 265 having a thickness of between 30%-80% of the thickness of the step 264, for example 40%-70%. In one embodiment, the thickness of the step 264 will be between 8-15 mm, for example 9-12 mm. The thickness of the step 265 can be between 2-7 mm, for example 3-6 mm. The transition region 266 can be slanted at an angle relative to the first step 264 of 20°-40°, for example 25°-35°. The overall length of the seal member 224 between first end 256 and second end 257 will be between 20-30 mm, for example 24-27 mm. The length of the first step 264 can be 2-3 times the length of the step 265. For example, the length of the step 264 can be between 10-16 mm, for example 12-15 mm. The length of the second step 265 can be 3-9 mm, for example 4-8 mm.

The filter element 162 preferably includes a ring oriented around and against the side wall 226 of the filter media pack arrangement 222. Many embodiments of rings are possible. One particular embodiment of a ring is illustrated in FIGS. 10-13 at reference numeral 272. The embodiment of the ring 272 illustrated includes a band 274. The band 274 generally has an overall shape that is the same as the shape of the filter element 162. In the illustrated embodiment, the band 274 is cylindrical in shape. The band 274 is sized such that it fits around and against the side wall 226 of the filter element 162. In particular, the band 274 has an interior surface 276 (FIGS. 12 and 13) that is oriented against the side wall 226 of the filter media pack arrangement 222. In some embodiments, the band 274 may be secured to the side wall 226 by glue or adhesive between the interior surface 276 and the side wall 226.

The band 274 further includes an exterior surface 278. The exterior surface 278 is oriented on an opposite side of the band 274 from the interior surface 276.

Figure 12:
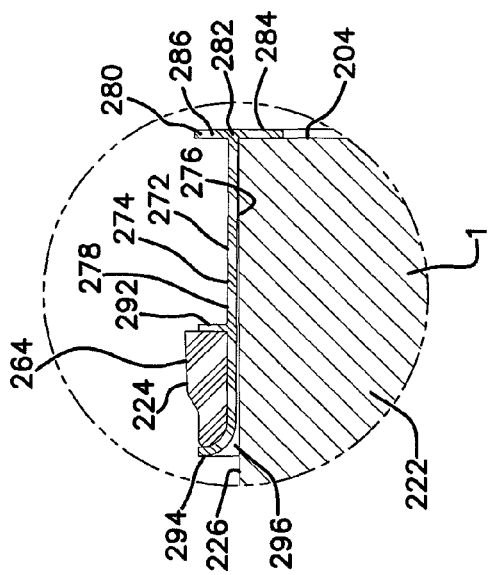
FIG. 12 is an enlarged, cross-sectional view of a portion of the filter element depicted in FIG. 11.

In the embodiment shown, the first seal member 224 is held by the ring 272. Specifically, the first seal member 224 is secured to the exterior surface 278 of the band 274. When the ring 272 is operably mounted to the filter media pack arrangement 222, the first seal member 224 is oriented radially from the filter media pack arrangement 222. As can be seen in FIG. 12, a portion of the band 274 is sandwiched between and against the interior surface 258 of the seal member 224 and the side wall 226 of the media pack arrangement 222.

In the embodiment illustrated, the ring 272 further includes a first stop flange 280 projecting radially from the band 274. In the embodiment shown, the first stop flange 280 is located at a first end 282 of the band 274. When operably mounted onto the media pack arrangement 222, the first stop flange 280 is located adjacent to the first flow face 204. Specifically, in preferred embodiments, the first stop flange 280 has an element engaging portion 284 that is oriented against the inlet flow face 204 (FIGS. 11 and 12). The first stop flange 280 further includes a cantilevered portion 286 that is free of any material around it. The cantilevered portion 286 also functions as a handle 288 when servicing the air cleaner 160. The handle 288 can be grasped by the person doing the servicing in order to manipulate the filter element 162.

The element engaging portion 284 of the first stop flange 280 can be in the form of spaced tabs 285. That is, the element engaging portion 284 can be either a continuous ring or, preferably, can be a plurality of tabs 285 evenly spaced about the periphery of the inlet flow face 204. The tabs 285 help to prevent the ring 272 from sliding over the filter element 162 and away from the inlet flow face 204. When in the form of spaced tabs 285, the element engaging portion 284 also helps to reduce the amount of filter media 1 that is blocked by the ring 272.

The first stop flange 280 is oriented to engage a portion of the cover 203, when the filter element 162 is operably installed in the air cleaner 160, with the cover 203 operably mounted to the filter body 202. In the embodiment shown in FIG. 8, the cover 203 includes an internal rim 290. The rim 290 extends radially from an internal surface of the cover 203. Engagement between the rim 290 and first stop flange 280 helps to hold the filter element 162 in operable position in the housing 200 with the primary seal 206 in place. Vibration, etc., can sometimes cause filter elements to become dislodged from being in proper sealing position within housings; the orientation of the first stop flange 280 and the rim 290 of the cover 203 help to prevent this from happening in the air cleaner 160.

The first stop flange 280 also helps to center the filter element 162 when installing the element 162 into the housing 200. Without the first stop flange 280, it might be possible to install the filter element 162 crooked within the housing body 202. A crooked installation could lead to the primary seal 206 being not completely, properly mounted or being vibrated or jarred from proper orientation.

Figure 13:
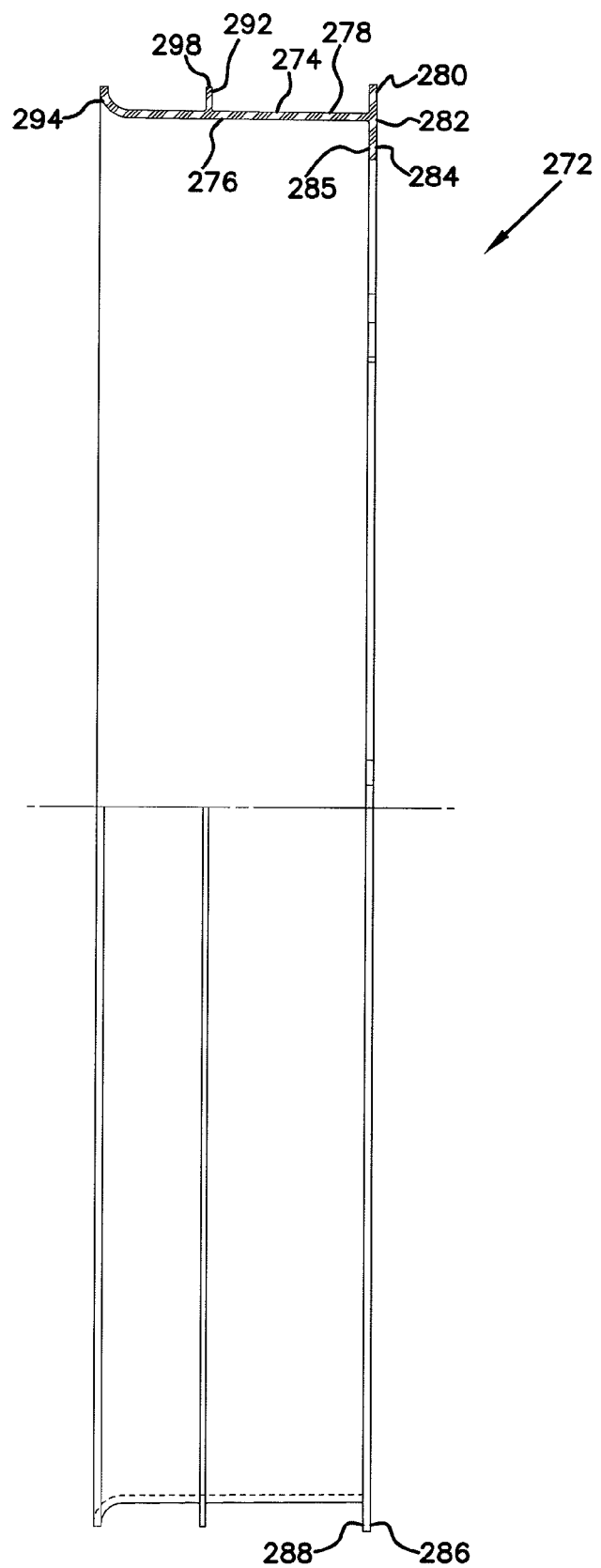
FIG. 13 is a side elevational, partial cross-sectional view of a ring utilized with the filter element of FIG. 10.

Still in reference to FIGS. 11-13, the ring 272 further includes a second stop flange 292 projecting radially from the band 274. In the embodiment shown, the second stop flange 292 extends radially in a same direction as the cantilevered portion 286 of the first stop flange 280. The second stop flange 292 helps to hold the seal member 224 on the ring 272. In the embodiment shown, the first end 256 of the seal member 224 is oriented against the second stop flange 292.

The band 274 includes a second end 294 opposite of the first end 282. The second end 294 is radiused or curved radially outwardly in a direction away from the media pack arrangement 222. This curved second end 294 helps to create a smoother insertion of the filter element 162 into the housing 200. A pocket 296 (FIG. 12) is created between the radiused second end 294 and the filter media pack arrangement 222. The pocket 296 collects adhesive, when adhesive is used to secure the ring 272 to the media pack arrangement 222.

In FIG. 12, it can be seen how the seal member 224 is oriented on the ring 272. Specifically, the seal member 224 is oriented between and against the second end 294 and the second stop flange 292. In one embodiment, the seal member 224 is oriented on the ring 272 by an interference fit; that is, the seal member 224 is stretched to fit around and circumscribe and squeeze the band 274 of the ring 272.

As can be seen in FIGS. 11 and 12, the step 264 of the seal member 224 extends radially further outwardly from the filter media pack arrangement 22 than the second stop flange 292 extends. When installed in the air cleaner 160, although the seal member 224 compresses between and against the inner seal surface 270 of the housing body 202 and the exterior surface 278 of the ring 272, the second stop flange 292 does not contact the inner sealing surface 270 of the housing body 202. There is a gap between the end 298 (FIG. 13) of the second stop flange 292 and the inner sealing surface 270. This gap allows for tilting, angling, or jarring the filter element 162 relative to the housing body 202 in order to remove the filter element 162 from the housing body 202 during servicing. A variety of embodiments are useable. In one example, the gap between the end 298 of the second stop flange 292 and the inner sealing surface 270 of the housing 202 is 0.5-4 mm, for example 2-3 mm.

The overall length of the ring 272 between first end 282 and second end 294 will vary depending upon the size of the filter element 162 and the application. In one example embodiment, the length is between 50-90 mm, for example 60-80 mm. The ring 272 is sized such that the seal member 224 is spaced between 50% and 99% of the overall length of the side wall 226. In the embodiment shown, the seal member 224 is oriented at a location of between 90%-98% of the overall length of the side wall 226. The seal member 226 can be located at least 5 mm, for example 7-25 mm, specifically 8-15 mm away from the inlet flow face 204.

E. Methods

A method of installing a filter element into an air cleaner is provided, utilizing the principles described herein. The method will be described in relation to the described embodiments of the air cleaner 160 described above.

First, filter element 162 is provided. The filter element 162 is inserted into the housing body 202 until primary seal 206 and seal 208 are formed between the filter element 162 and the housing body 202. The seal 208 is preferably radial seal 268 and is oriented between and against the housing body 202 and the exterior surface 278 of the ring 272.

After inserting the filter element 162, the cover 203 is oriented over the housing body 202 to engage a portion of the cover 203 against the first stop flange 280 extending from the band 274 of the ring 272. In particular, the rim 290 of the cover 203 engages the first stop flange 280, to help prevent the filter element 162 from backing out of its proper mounting within the body member 202.

Next, the latches 216 are manipulated to secure the cover 203 to the housing body 202.

The step of inserting the filter element 162 into the housing body 202 includes using the stop flange 280 to center the filter element 162 in the housing body 202.

Preferably, the step of inserting the filter element 162 into the housing body 202 includes forming primary seal 206, in the form of a second radial seal 233 between and against an internal sealing surface of the housing body 202 and an annular surface on extension 236 projecting from one of the inlet face 204 and outlet face 205. In the embodiment shown, the extension 236 projects from the outlet flow face 205.

A method of filtering includes allowing air or gas flow to flow within the slots 214 of the inlet grid 212 of the cover 203. The air then flows straight, through the inlet flow face 204 of the filter element 162. The Z-media 1 of the filter element 162 removes dust and other impurities from the air. The filtered air then exits the filter element 162 through the outlet flow face 205. From there, the air flows through the outlet tube 210 and then flows to downstream equipment, such as the turbo 156 of an engine 153. While filtering, the primary seal 206 prevents air from bypassing the filter media 1. The secondary seal 208 also helps to prevent air from bypassing the filter media 1, and in addition prevents the accumulation of dust in the body 202 along the side wall 226 of the filter element 162.

A method of servicing is provided. To service the air cleaner 160, the cover 203 is removed from the housing body 202 to expose the filter element 162. The handle 288 of the first stop flange 280 is grasped. In the embodiment shown, the handle 288 is extending radially from the filter element 162. The filter element 162 is moved to release the radial seal 268 and radial seal 233 between the filter element 162 and the housing body 202. This step of moving the filter element 162 can include tilting, wiggling, jarring, or otherwise working the filter element 162 loose by a combination of axial forces and other non-axial forces in a direction away from the housing body 202. The filter element 162 is then removed from the housing body 202.

The step of moving the filter element 162 includes releasing the radial seal 268 between the housing body 202 and the ring 272 secured to the filter element 162. The ring 272 includes the first stop flange 280.

The old filter element 162 is then discarded, and replaced with a second, new filter element 162. The second filter element 162 is operably installed into the housing body 202 to again form the first and second radial seals 268, 233. The cover 203 is then operably mounted over the housing body 202, and the latches 216 are engaged. While placing the cover 203 over the body 202, the rim 290 may touch or otherwise engage the first stop flange 280. The first stop flange 280 does not need to necessarily touch or otherwise engage the rim 290 of the cover 203 in order for the filter element 162 to be properly and operably mounted within the housing 200.

What is claimed is:

1. A filter arrangement comprising:
 (a) a filter media pack arrangement including filter media comprising corrugated media secured to facing media and defining a plurality of inlet flutes and outlet flutes;
   (i) the filter media pack arrangement having first and second opposite sides and defining am inlet flow face and an opposite outlet flow face;
   (ii) the filter media pack arrangement having a sidewall between the inlet flow face and outlet flow face;
 (b) a ring oriented around and against the sidewall of the filter media pack arrangement;
   (i) the ring including a band having an interior surface oriented against the sidewall of the filter media pack arrangement and an opposite exterior surface;
   ii) the ring includes a first stop flange projecting radially from the band;
 (c) a first seal member secured to the exterior surface of the band;
   (i) said first seal member being oriented radially from the filter media pack arrangement; and
 (d) a second seal member secured to the filter media pack arrangement.

2. A filter arrangement according to claim 1 further including:
 (a) the second seal member secured to the filter media pack arrangement comprises polyurethane foam.

3. A filter arrangement according to claim 1 wherein:
 (a) the second seal member is oriented radially from the filter media pack arrangement.

4. A filter arrangement according to claim 3 further including:
 (a) a frame securing the second seal member to the filter media pack arrangement;
   said frame having an axial extension;
   (i) said axial extension projecting axially from one of the inlet and outlet flow faces; said axial extension having an annular portion;
     (A) said annular portion of said axial extension supporting said second seal member to orient said second seal member in a radial direction.

5. A filter arrangement according to claim 4 wherein:
 (a) the frame further includes a skirt circumscribing the sidewall of the filter media pack arrangement.

6. A filter arrangement according to claim 1 wherein:
 (a) the first stop flange is located at a first end of the band.

7. A filter arrangement according to claim 6 wherein:
 (a) the first stop flange is located adjacent to one of the inlet and outlet flow faces.

8. A filter arrangement according to claim 1 wherein:
 (a) the ring includes a second stop flange projecting radially from the band.

9. A filter arrangement according to claim 8 wherein:
 (a) the band includes a first end and a second end;
   (i) the first stop flange is located at the first end of the band; and
   (ii) the second stop flange is located between the first end and second end of the band.

10. A filter arrangement according to claim 9 wherein:
 (a) the first seal member is oriented between the second end of the band and the second stop flange.

11. A filter arrangement according to claim 1 wherein:
 (a) the filter media pack arrangement comprises a coiled construction;
   (i) the inlet flow face and outlet flow face are planar and parallel to each other.

12. A filter arrangement according to claim 5 wherein:
 (a) the skirt includes a plurality of ribs radially projecting therefrom.

13. An air cleaner comprising:
 (a) a housing including a body member and a cover; said body member defining an interior;
 (b) a filter element operably installed within said body member interior; said filter element including:
   (i) a filter media pack arrangement including filter media comprising corrugated media secured to facing media and defining a plurality of inlet flutes and outlet flutes;
     (A) the filter media pack arrangement having first and second opposite sides and defining an inlet flow face and an opposite outlet flow face;
     (B) the filter media pack arrangement having a sidewall between the inlet flow face and outlet flow face;
   (ii) a ring oriented around and against the sidewall of the filter media pack arrangement;
     (A) the ring including a band having an interior surface oriented against the sidewall of the filter media pack arrangement and an opposite exterior surface;
     (B) the ring includes a first stop flange projecting radially from the band;
       (i) the cover axially engaging the first stop flange;
   (iii) a first seal member secured to the exterior surface of the band;
     (A) the first seal member being oriented radially from the filter media pack arrangement to form a radially directed seal between the body member and the filter element; and
   (iv) a second seal member secured to the filter media pack arrangement;
     (A) the second seal member oriented to form a seal between the body member and the filter element.

14. An air cleaner according to claim 13 wherein:
 (a) the second seal member forms a radial seal between the body member and the filter element.

15. An air cleaner according to claim 14 wherein:
 (a) the filter element further includes:
   (i) a frame securing the second seal member to the filter media pack arrangement; said frame having an axial extension;
     (A) said axial extension projecting axially from one of the inlet and outlet flow faces; said axial extension having an annular portion;
     (B) said annular portion of said axial extension supporting said second seal member to orient said second seal member in a radial direction;
   (ii) the second seal member forming the radial seal by compression of the second seal member between and against the body member and the annular portion of the axial extension.

16. A method of installing a filter element into an air cleaner; the method comprising:
 (a) providing a filter element including a filter media pack arrangement having filter media comprising corrugated media secured to facing media and defining a plurality of inlet flutes and outlet flutes;

(i) the filter media pack arrangement having first and second opposite sides and defining an inlet flow face and an opposite outlet flow face;
(ii) the filter media pack arrangement having a sidewall between the inlet flow face and outlet flow face;
(iii) a ring oriented around and against the sidewall of the filter media pack arrangement;
  (A) the ring including a band having an interior surface oriented against the sidewall of the filter media pack arrangement and an opposite exterior surface;
(b) inserting the filter element into a housing body until first and second seals are formed between the filter element and the housing body;
(i) the first seal being a radial seal being between and against the housing body and the exterior surface of the ring; and
(c) after inserting the filter element until first and second seals are formed, operably orienting a cover over the housing body to engage a portion of the cover against a stop flange extending from the band of the ring.

17. A method according to claim 16 wherein:
(a) the step of inserting includes using the stop flange radially extending from the band of the ring to center the filter element in the housing body.

18. A method according to claim 16 wherein:
(a) the step of inserting the filter element into a housing body until first and second seals are formed between the filter element and the housing body includes forming a second radial seal between and against the housing body and an annular surface on an extension projecting from one of the inlet and outlet flow faces.

19. A method of servicing an air cleaner having a cover and a housing body; the method comprising:
(a) removing the cover from the housing body to expose a filter element operably installed in the housing body;
(i) the filter element including a filter media pack arrangement having filter media comprising corrugated media secured to facing media and defining a plurality of inlet flutes and outlet flutes;
  (A) the filter media pack arrangement having first and second opposite sides and defining an inlet flow face and an opposite outlet flow face;
(b) grasping a flange extending radially from the filter element;
(c) moving the filter element to release first and second radial seals between the filter element and the housing body;
(d) removing the filter element from the housing body; and
(e) operably installing a second filter element into the housing body to form first and second radial seals between the filter element and the housing body.

20. A method of servicing according to claim 19 wherein:
(a) the step of moving the filter element includes releasing the first radial seal between the housing body and a ring secured to the filter element; the ring including the flange.

21. A filter arrangement comprising:
(a) a filter media pack arrangement including filter media comprising corrugated media secured to facing media and defining a plurality of inlet flutes and outlet flutes;
(i) the filter media pack arrangement having first and second opposite sides and defining am inlet flow face and an opposite outlet flow face;
(ii) the filter media pack arrangement having a sidewall between the inlet flow face and outlet flow face;
(b) a ring oriented around and against the sidewall of the filter media pack arrangement;
(i) the ring including a band having an interior surface oriented against the sidewall of the filter media pack arrangement and an opposite exterior surface;
(c) a first seal member secured to the exterior surface of the band;
(i) said first seal member being oriented radially from the filter media pack arrangement;
(d) a second seal member secured to the filter media pack arrangement; the second seal member being oriented radially from the filter media pack arrangement; and
(e) a frame securing the second seal member to the filter media pack arrangement;
said frame having an axial extension;
(i) said axial extension projecting axially from one of the inlet and outlet flow faces; said axial extension having an annular portion;
  (A) said annular portion of said axial extension supporting said second seal member to orient said second seal member in a radial direction.

22. A filter arrangement according to claim 21 wherein:
(a) the frame further includes a skirt circumscribing the sidewall of the filter media pack arrangement.

23. A filter arrangement according to claim 21 wherein:
(a) the filter media pack arrangement comprises a coiled construction;
(i) the inlet flow face and outlet flow face are planar and parallel to each other.

24. An air cleaner comprising:
(a) a housing including a body member and a cover; said body member defining an interior;
(b) a filter element operably installed within said body member interior; said filter element including:
(i) a filter media pack arrangement including filter media comprising corrugated media secured to facing media and defining a plurality of inlet flutes and outlet flutes;
  (A) the filter media pack arrangement having first and second opposite sides and defining an inlet flow face and an opposite outlet flow face;
  (B) the filter media pack arrangement having a sidewall between the inlet flow face and outlet flow face;
(ii) a ring oriented around and against the sidewall of the filter media pack arrangement;
  (A) the ring including a band having an interior surface oriented against the sidewall of the filter media pack arrangement and an opposite exterior surface;
  (B) the ring including first and second stop flanges each extending radially from the band;
    (i) the first stop flange being at a first end of the band;
    (ii) the second stop flange being between a second end of the band and the first stop flange;
(iii) a first seal member secured to the exterior surface of the band;
  (A) the first seal member being oriented radially from the filter media pack arrangement to form a radially directed seal between the body member and the filter element;
  (B) the first seal member being between the second end of the band and the second stop flange;
  (C) the first seal member being radially compressed between and against an interior of the body member and the exterior surface of the band to form a compressed first seal member; and
  (D) the compressed first seal member extending radially beyond the second stop flange; and (iv) a second seal member secured to the filter media pack arrangement;
    (A) the second seal member oriented to form a seal between the body member and the filter element.

25. An air cleaner according to claim 24 wherein:
   (a) the second seal member forms a radial seal between the body member and the filter element.

26. An air cleaner according to claim 25 wherein:
   (a) the filter element further includes:
      (i) a frame securing the second seal member to the filter media pack arrangement; said frame having an axial extension;
         (A) said axial extension projecting axially from one of the inlet and outlet flow faces; said axial extension having an annular portion;
         (B) said annular portion of said axial extension supporting said second seal member to orient said second seal member in a radial direction;
      (ii) the second seal member forming the radial seal by compression of the second seal member between and against the body member and the annular portion of the axial extension.

27. A method of installing a filter element into an air cleaner; the method comprising:
   (a) providing a filter element including a filter media pack arrangement having filter media comprising corrugated media secured to facing media and defining a plurality of inlet flutes and outlet flutes;
      (i) the filter media pack arrangement having first and second opposite sides and defining an inlet flow face and an opposite outlet flow face;
      (ii) the filter media pack arrangement having a sidewall between the inlet flow face and outlet flow face;
      (iii) a ring oriented around and against the sidewall of the filter media pack arrangement;
         (A) the ring including a band having an interior surface oriented against the sidewall of the filter media pack arrangement and an opposite exterior surface;
   (b) inserting the filter element into a housing body until first and second seals are formed between the filter element and the housing body;
      (i) the first seal being a radial seal being between and against the housing body and the exterior surface of the ring; and
      (ii) the step of inserting includes using a stop flange radially extending from the band of the ring to center the filter element in the housing body.

28. A method of installing a filter element into an air cleaner; the method comprising:
   (a) providing a filter element including a filter media pack arrangement having filter media comprising corrugated media secured to facing media and defining a plurality of inlet flutes and outlet flutes;
      (i) the filter media pack arrangement having first and second opposite sides and defining an inlet flow face and an opposite outlet flow face;
      (ii) the filter media pack arrangement having a sidewall between the inlet flow face and outlet flow face;
      (iii) a ring oriented around and against the sidewall of the filter media pack arrangement;
         (A) the ring including a band having an interior surface oriented against the sidewall of the filter media pack arrangement and an opposite exterior surface;
   (b) inserting the filter element into a housing body until first and second seals are formed between the filter element and the housing body;
      (i) the first seal being a radial seal being between and against the housing body and the exterior surface of the ring; and
      (ii) the second seal being a second radial seal between and against the housing body and an annular surface on an extension projecting from one of the inlet and outlet flow faces.

\* \* \* \* \*

UNITED STATES PATENT AND TRADEMARK OFFICE
CERTIFICATE OF CORRECTION

PATENT NO. : 8,083,825 B2  Page 1 of 1
APPLICATION NO. : 11/816994
DATED : December 27, 2011
INVENTOR(S) : Mosset et al.

It is certified that error appears in the above-identified patent and that said Letters Patent is hereby corrected as shown below:

Column 17, line 16: Per September 1, 2011 amendment for claim 1, line 6 of claim: "am inlet flow face" should be "an inlet flow face"

Column 19, line 62: Per September 1, 2011 amendment for claim 25 (final claim 21), line 6 of claim: "am inlet flow face" should be "an inlet flow face"

Signed and Sealed this
Twenty-first Day of August, 2012

David J. Kappos
*Director of the United States Patent and Trademark Office*